United States Patent [19]

Kopylov et al.

[11] 4,292,928

[45] Oct. 6, 1981

[54] POULTRY BROODING PLANT

[76] Inventors: Alexei A. Kopylov, ulitsa Lenina, 9/11, kv. 18; Valentin T. Kuzmenko, B. Bulvarnaya ulitsa, 8, kv. 29; Alexandr N. Stepanov, pereulok Turgenevsky, 23; Viktor P. Gaschenko, B. Prospekt, 46, kv. 45, all of, Taganrog; Nikolai A. Kaznacheevsky, ulitsa imeni Grecheskogo goroda Volos, 25/98, kv. 18, Rostov-na-Donu; Alexandr Y. Nosovitsky, ulitsa Pushkinskaya, 38, kv. 4, Rostov-na-Donu; Ivan I. Misikov, ulitsa Pushkinskaya, 181, kv. 18, Rostov-na-Donu; Alexandr I. Shapiro, ulitsa imeni Grecheskogo goroda Volos, 25/98, kv. 38, Rostov-na-Donu; Ivan G. Skakunov, ulitsa B. Cherkizovskaya, 8, kv. 10, Moscow; Valentin G. Markin, prospekt Kommunistichesky, 38/2, kv. 16, Rostov-na-Donu; Alexei K. Konstantinov, ulitsa Svobody 15 kv. 86, Taganrog; Eduard S. Abramian, ulitsa B. Cherkizovskaya, 9a, kv. 11, Moscow; Arseny M. Soroka, ulitsa Gerasima Kurina, 42, kv. 33, Moscow; Yakov A. Zinchenko, ulitsa 2 Krasnodarskaya, 70/1, kv. 10, Rostov-na-Donu, all of U.S.S.R.

[21] Appl. No.: 95,389

[22] Filed: Nov. 19, 1979
[51] Int. Cl.³ ............................................. A01K 31/06
[52] U.S. Cl. ...................................... 119/17; 119/22
[58] Field of Search ........................ 119/17, 18, 21, 22

[56] References Cited
U.S. PATENT DOCUMENTS

| | | | |
|---|---|---|---|
| 2,257,734 | 10/1941 | Cornell | 119/21 |
| 3,045,612 | 7/1962 | Byrnes | 119/22 X |
| 3,621,818 | 11/1971 | Johnston et al. | 119/17 X |
| 3,797,460 | 3/1974 | Blankenship | 119/17 |

Primary Examiner—Hugh R. Chamblee
Attorney, Agent, or Firm—Burton L. Lilling

[57] ABSTRACT

A characteristic feature of the invention is that in a plant comprising a plurality of multilevel container cages incorporating the life provision means for the entire period from placing day-old chicks into the cages until the time of completion of their growing, the cages are periodically displaced by a system of pushing conveyers in a sequence defined by the adopted rearing technology. Each container cage has in the upper portion thereof a frame pivotally connected to the cage and operatively connected with a pushing conveyer, the frame providing for rotating the container cage about the horizontal axis of the frame. The rotation is effected with aid of a member comprising a bell crank of which one arm has cage-engaging means, and the other arm is provided with a counterweight.

12 Claims, 4 Drawing Figures

POULTRY BROODING PLANT

The present invention relates to the technology of commercial brooding or rearing of poultry, and more particularly it relates to a plant for transfer-less rearing of broilers in specifically constructed container cages.

The brooding plant disclosed herein combines within a single process the growing, conveying and servicing of poultry, wherein every operation involved in the process is mechanized and automated.

Plants of this kind are used to their utmost efficiency under the conditions of a large industrialized poultry-brooding farm.

At present, various arrangements are known for growing poultry in transportable cages. Thus, there is known a cage battery transportable from enclosed premises and having a box-like frame supporting perforated walls. Underlying the flexible floor of the cage, secured to the frame solely about the periphery thereof, is a belt conveyer for carrying away droppings from the cage.

In another known arrangement, the poultry-growing container comprises a frame shaped as a truncated pyramid having a floor and a lid detachably secured thereto, which provides for facilitated transportation of the containers in accordance with the adopted rearing technology.

It is obvious that each of the abovementioned known arrangements only partly solves the problems of growing poultry, that is, the first-mentioned arrangement solves the problem of removing droppings, whereas the last-mentioned one facilitates transportation of the containers. These arrangements, however, fail to solve the problems involved in the overall poultry-growing process.

There are also known cage batteries comprising several levels of cages and means for rearing the poultry, e.g. feeders, water bowls, vessels for collecting the droppings.

There is also known a method of growing poultry, including transporting chicks from the incubation station, rearing them and carrying them to the place of slaughtering within one and the same cage. This cage is rotatable through 90° upon the chicks reaching a specified age. The feeder through in this cage is likewise adjustable to follow the growth of a chick. This construction of the arrangement provides for a greater space required by the growing young.

There is also known a similar method including placing chicks freshly brooded in an incubator into individual cells adapted for containing, feeding and watering the young. Then, grown chicks are transferred into containers of a greater volume, to stay there until full development, the cells being rotated through 90° at a specified moment to provide a normal living space for the grown poultry.

There is still further known a method including rearing poultry in a container having mounted therein horizontal conveyers and vertical partitions dividing the containers into individual chambers. The poultry is reared at several levels on the conveyers, the latter being actuated so that droppings and the dead are collected at specified portions along the path of the conveyers.

A disadvantage common to all the abovedescribed known techniques is their dependence upon the availability of mobile transportation means. Although forming no integral part of the abovedescribed arrangements, the transportation means are, nevertheless, indispensable. A container per se lacks mobility: it has to be placed onto a transportation means, carried thereon and removed therefrom, which affects the efficiency of the container technique of rearing poultry.

Another shortcoming of the known arrangements and methods is the lack of optimized solutions for the problem of unloading the poultry from the containers at the end of the growing period. This operation is the most labor-consuming one among all the stages of the cycle.

There is also known an arrangement for rearing egg-laying birds in the same multilevel cage batteries mounted on a conveyer, the cages incorporating feeders, drinking bowls and dropping-collecting trays and being adapted to be periodically supplied with the feed and water, while passing through a dispensing station.

However, this arrangement of the prior art likewise fails to provide for mechanization of the most labor-consuming operations, which lowers the efficiency of its employment in commercial growing of poultry.

It is the main object of the present invention to create a poultry brooding plant comprising mobile container cages.

It is another object of the present invention to provide for the reduction of the moisture content of droppings accumulating in vessels underlying the levels of a container cage throughout the poultry-growing period.

It is yet another object of the present invention to provide for uniform removal of the unloaded poultry.

It is still another object of the present invention to increase the labor productivity of growing poultry in containers.

These and other objects of the present invention are attained in a poultry brooding plant, e.g., broilers, comprising a plurality of multilevel container cages incorporating life-provision or rearing means for the entire period from placing day-old chicks into the cages till the time of completion of the growing cycle, the cages being periodically displaceable by a system of pushing conveyers in a sequence defined by the adopted rearing technology. In accordance with the present invention, each container cage has in the upper portion thereof a frame pivotally connected to the cage and operatively connected with the conveyer, the frame providing for rotation of the container cage about the horizontal axis of the frame, the rotation being effected with aid of a member including a bell crank of which one arm carries container cage engaging means and the other arm carries a counterweight.

It is expedient to provide each level of the container cage with a door which can open by tilting the container cage, and with a dropping-collecting vessel.

It is further expedient to provide the plant with means for pushing out the vessels with droppings collected therein from the container cages.

It is still further expedient to have in the lower portion of each level of the container cage ports for the passage of the pushing means.

It is further expedient to provide the plant with receiving and overturning devices positioned at dropping-unloading stations, into which devices the dropping-collecting vessels are adapted to be pushed from the container cages.

It is further expedient that the plant include a conveyer arranged in the poultry-slaughtering area, onto which conveyer the poultry can be unloaded from the container cages.

The essence of the present invention is as follows. In the incubator house, day-old chicks are loaded onto each level of a container cage through the latter's open doors. Then the container cages are forwarded by a pushing conveyor to the poultry-rearing area. The pushing conveyor may have a multilink endless chain structure with container-lowering sections. Within the poultry-rearing area, the container cage is advanced daily by the conveyor toward feed and water metering devices which dispense the feed and water in accordance with the needs of the growing poultry. The poultry being reared in the a container cages walk over a lattice-type floor. The droppings are collected in vessels provided under each level of the container cages. The capacity of the vessels is sufficient for collecting the droppings throughout the entire poultry-growing period. Within this poultry-growing period the doors of the container cages are closed and retained in the closed position. Upon the completion of the poultry-growing period, the container cages are advanced toward the poultry-unloading zone, being relieved in advance from the dropping-collecting vessels. One of the walls of each container cage has in the lower portion thereof ports for the passage of means adapted to push these vessels out from the containers, the ports in the walls being arranged in opposition to the vessels. The vessels are pushed from the container cages into vessel-receiving and overturning devices mounted at the dropping-unloading station.

The grown poultry are unloaded by rotating the container cages about the horizontal axis of a frame pivotally connected to the top portion of each container. The frame, in its turn, is operatively connected with the pushing conveyor, which provides for advancing the container cages in the required direction.

The rotation of the container cage is effected by the combined action of the container-lowering section of the pushing conveyor and of a member including a bell crank of which one arm carriers a container-engaging means and the other arm carries a counterweight. As the container cage is tilted to a corresponding angle, the birds walk over from the floor of the cage upon the door thereof, so that the door opens. It is expedient to thus unload the poultry directly onto a conveyer adapted to carry them to a slaughtering station.

The herein disclosed plant can be employed to utmost efficiency by large commercial poultry-rearing farms where it is capable of significantly reducing the amount of labor consumed by the operations of removing the droppings and unloading the poultry.

The essence of the invention will be better understood from the following description of an embodiment of a poultry brooding plant, with reference being had to the accompanying drawings, wherein.

Figure 1:
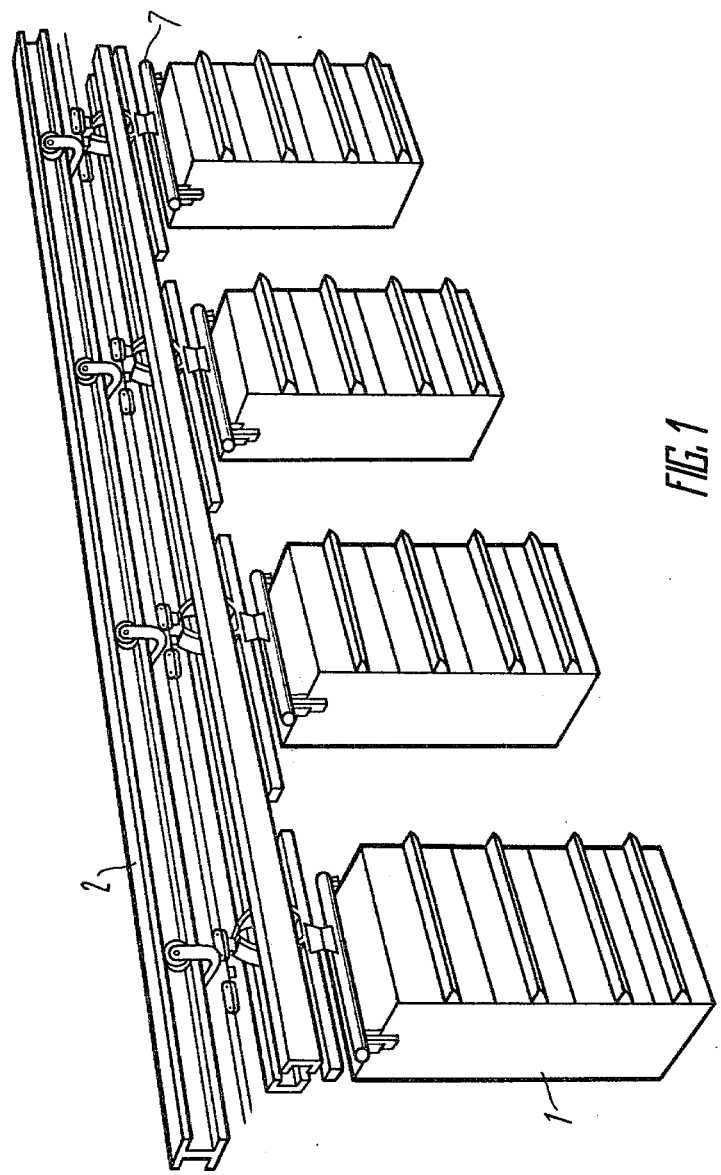
FIG. 1 is a general perspective view of a plant embodying the invention.
Figure 2:
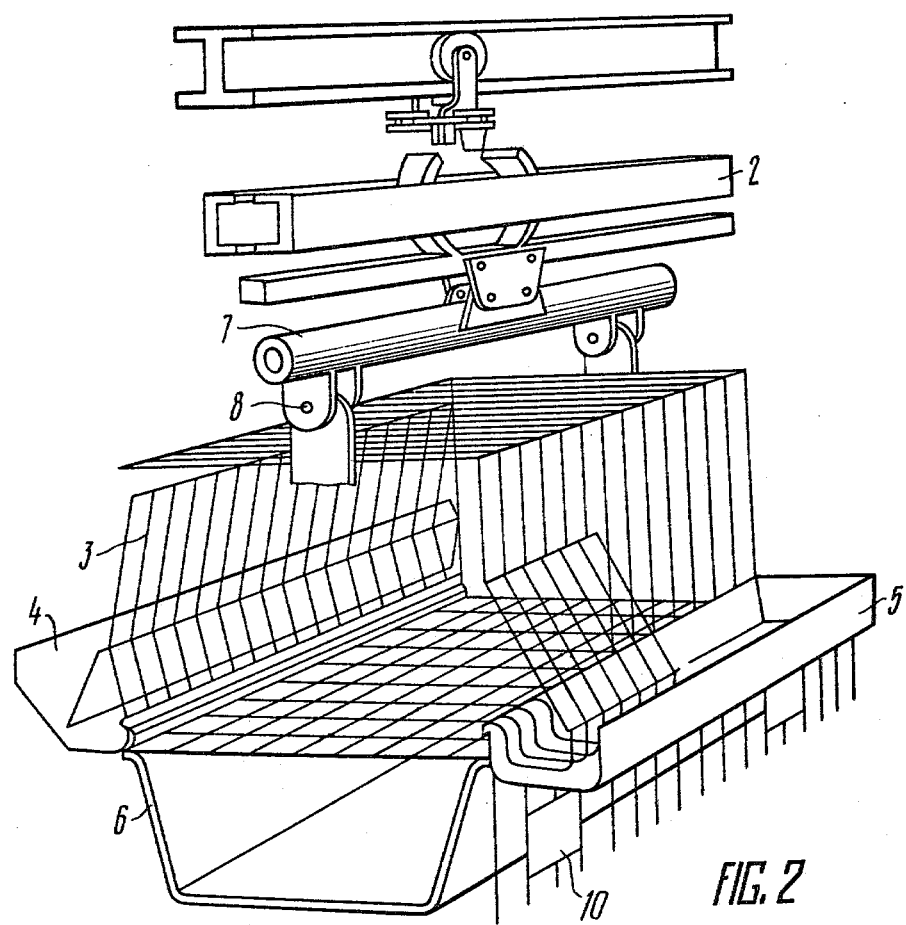
FIG. 2 is a fragmentary view of a container cage and its connection with a pushing conveyer.

In the drawings, the poultry brooding plant (FIGS. 1 and 2) includes a plurality of multilevel container cages 1 supported by a pushing conveyer 2.

The number of the container cages 1 in the plant is determined by the capacity of the brooding plant, whereas the number of the levels of the container cages 1 is determined by the dimensions of the building accommodating the plant.

The pushing conveyor 2 can be of any suitable known structure capable of advancing the container cages 1 which are not rigidly connected with the actuating member or impeller of the conveyer, the latter incorporating a container-lowering section.

Each container cage is a parallelepiped-shaped lattice structure divided height-wise into the levels. Each level of the container cage 1 has a door 3, a feeder 4, a drinking bowl 5 and an underlying vessel 6 for collecting droppings or dung.

The door 3 is openable for placing and unloading the poultry, and throughout the growing period it is kept closed and retained in the closed position.

The container cage 1 is provided at the top thereof with a frame 7 connected to the container cage 1 with aid of a pivot joint 8.

The frame 7 is connected with a suspension member of the conveyer 2.

The container cage 1 has in the lower portion of the wall of each its level ports 10 for the passage therethrough of means 11 (FIG. 4) adapted to push the vessels 6 out from the container cages 1.

The means 11 for pushing out the vessels 6 are arranged along the path of the conveyer 2, in the zone of unloading the collected droppings, following the completion of the poultry-growing cycle.

The pushing means may be of any known structure suitable for the purpose.

Figure 4:
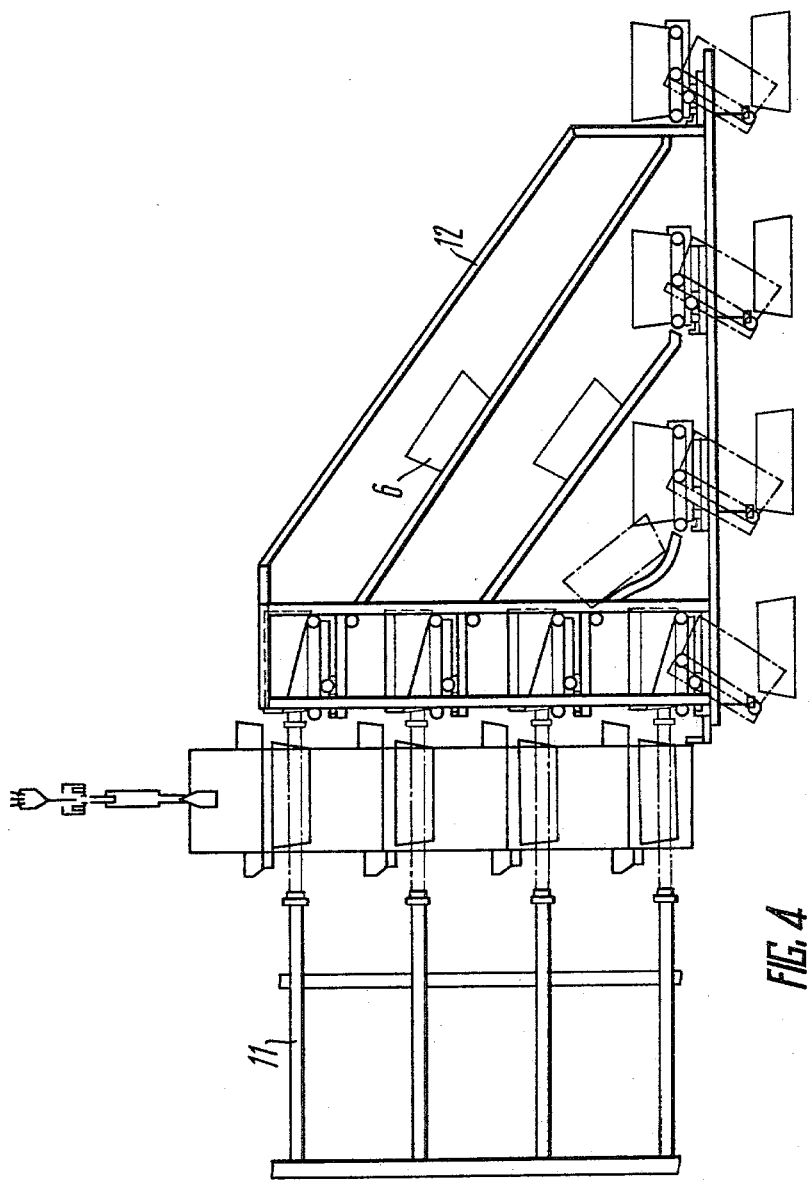
FIG. 4 illustrates the pushing of the dropping-collecting vessels from the container cage, in accordance with the invention.

The vessels 6 are adapted to be pushed into receiving and overturning device 12. (FIG. 4).

However, the structure of the abovedescribed device may be different depending on the technique of removing the droppings in accordance with the adopted poultry-growing technology.

Figure 3:
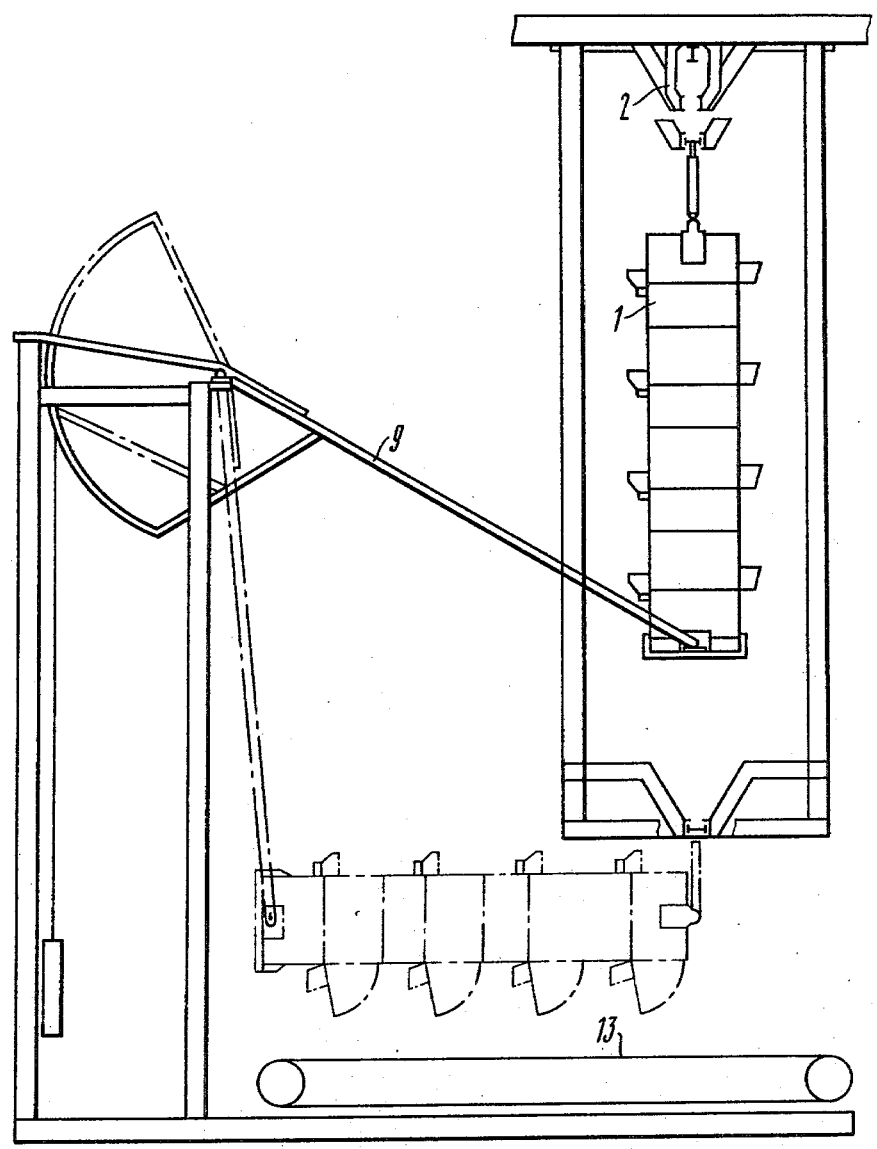
FIG. 3 illustrates rotation of the container cage and the opening of the latter's door.

The plant further comprises a bell crank 9 (FIG. 3) of which one arm carries means for engaging the container cage 1 and the other arm carries a counterweight.

The combined action of the container-lowering section of the conveyer 2 and of the bell crank 9 provides for rotating or tilting the container cage 1 about the horizontal axis of the frame 7.

This rotation provides for opening the doors 3 and unloading the poultry onto the conveyer 13 adapted to carry the birds to the slaughtering station.

The plant is operated, as follows.

Day-old chicks are loaded into the levels of the container cages 1, and the latter are advanced by the pushing conveyer 2 toward the poultry-growing area. Within the growing period the container cages 1 with the birds therein are periodically moved past the feed and water metering-out devices (not shown in the drawings) which fill the feeders 4 and the drinking bowls 5.

While the container cages 1 are advanced, the condition of the birds is observed, and, whenever necessary, some birds are culled.

Throughout the time not required for moving the container cages 1 toward the metering-out devices, they are held static.

The droppings are accumulated in the vessels 6 for the entire period of growing the poultry in the container cages 1, which enables to reduce their moisture content by drying.

Upon the completion of the poultry-growing process, the container cages 1 are advanced toward the droppings unloading area where the means 11 are actuated to pass into the ports 10 in the walls of the cages, to push out the vessels 6 with the accumulated droppings therein. The vessels 6 are thus forwarded into the receiving-overturning device 12 where they are overturned to release the droppings which are consequently carried away for utilization, while the vessels 6 are also carried away to be washed.

The container cages 1 relieved from the vessels 6 are advanced to the slaughtering area, to unload the birds therein. In the slaughtering area the pushing conveyer 2 has a container-lowering section, and there is also mounted therein the member including the bell crank 9 of which one arm is adapted to engage the container cage 1 and the other arm carries a counterweight.

The combined action of the lowering container cage 1 and of the bell crank 9 tilts the container cage 1. This tilting causes the birds to walk over onto the door 3 of the cage, whereby the door 3 is opened and the latter drop out of the cage.

The conveyer 13 arranged in the poultry unloading zone receives the birds and carries them toward the slaughtering station.

Then the action of the container-lowering section and of the bell crank 9 restores the container cage 1 to its initial altitude, whereafter the conveyer 2 carries the container cage 1 to a washing and disinfecing station.

The herein disclosed plant enables all-through automation into the process of growing poultry, e.g. broilers, at poultry-rearing farms, increases the labor productivity and reduces the cost of operations of unloading the birds, removing their droppings, washing and disinfecting the poultry brooding equipment, as well as that of transporting and processing the droppings.

What is claimed is:

1. A self-contained automated poultry brooding plant, comprising:
   a plurality of multilevel container cages with means for housing and rearing poultry from chicks until the end of the poultry growing period;
   said cages being rotatably mounted on a horizontal frame which is affixed to a conveyer system with means for automatically advancing the cages at a rate of movement in accordance with established poultry growth patterns;
   said cages having doors which open when the cage is horizontally rotated through a predetermined angle;
   said cages having means which engage with a bell crank located near the conveyer system at a location corresponding to the end of the poultry growing period, whereby the engagement of the cage with the bell crank serves to horizontally rotate the cage at the end of the poultry growing period to said predetermined angle which automatically opens the cage door and unloads the pountry.

2. A plant according to claim 1, wherein said poultry are broilers.

3. A plant as set forth in claim 1, wherein each level of said container cage has in the lower portion thereof openings to enable the passage therethrough of pushing means.

4. A plant as set forth in claim 1, comprising receiving and overturning means arranged in a droppings unloading area, into which vessels may be pushed out from said container cages.

5. A plant as set forth in claim 1, comprising a conveyer arranged in a slaughtering area, adapted to receive poultry being unloaded thereupon.

6. A plant as set forth in claim 1, wherein each level of said container cage is provided at the lower portion thereof with a removable vessel adapted for collecting poultry droppings therein.

7. A plant as set forth in claim 6, comprising means for removing said droppings vessels from said container cages.

8. A plant as set forth in claim 6, wherein each level of said container cage has in the lower portion thereof openings to enable the passage of pushing means therethrough.

9. A plant as set forth in claim 6, comprising receiving and overturning means arranged in a droppings unloading area, into which said vessels are adapted to be pushed out from said container cages.

10. A plant as set forth in claim 1, comprising means for removing vessels from said container cages.

11. A plant as set forth in claim 10, wherein each level of said container cage has in the lower portion thereof openings to enable the passage of pushing means therethrough.

12. A plant as set forth in claim 10, comprising receiving and overturning means arranged in a droppings unloading area, into which vessels may be pushed out from said container cages.

* * * * *